United States Patent Office

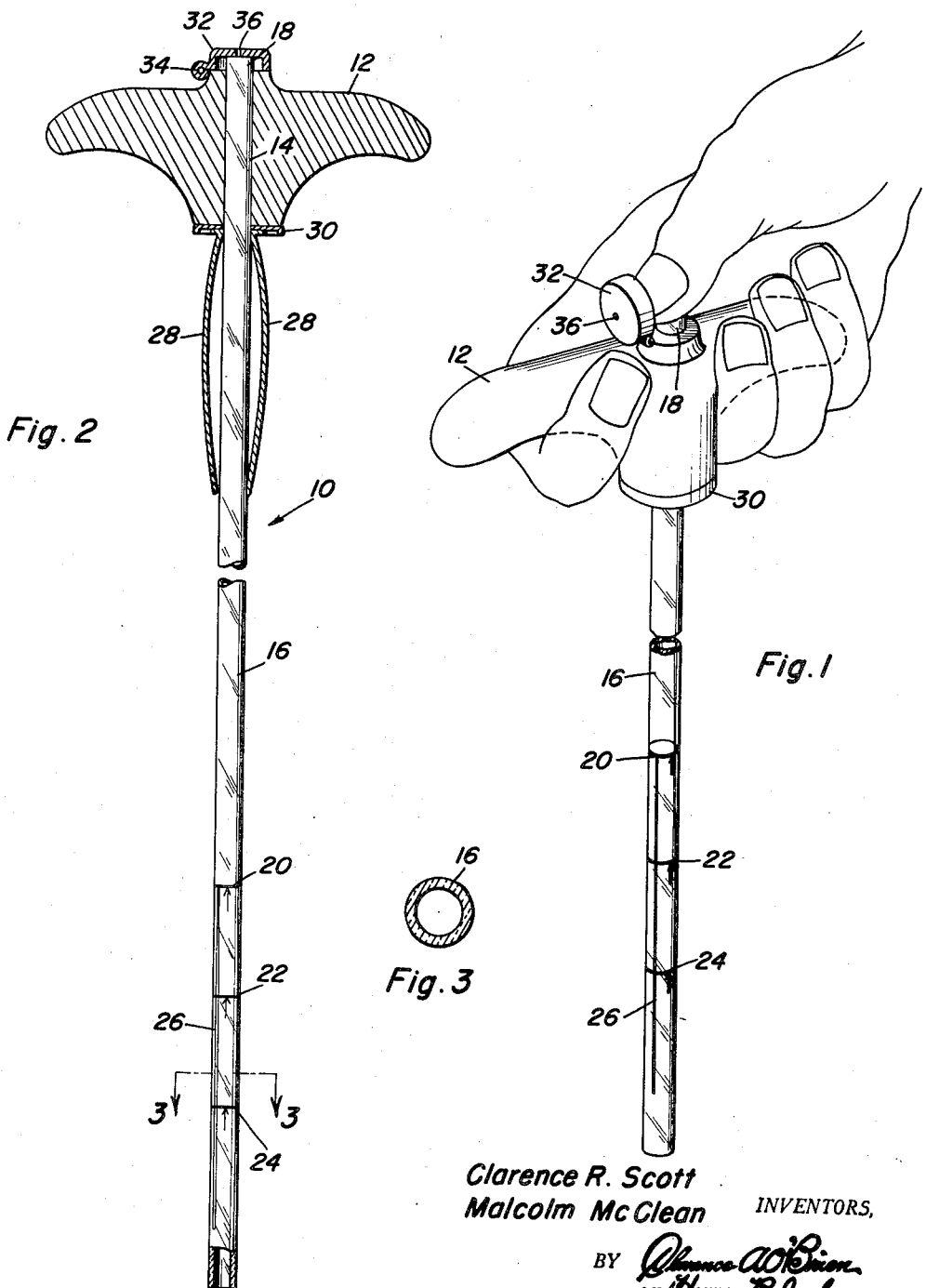

2,782,514
Patented Feb. 26, 1957

2,782,514

HOLLOW OIL DIP STICK

Clarence R. Scott and Malcolm McClean, Fremont, Nebr.

Application May 10, 1955, Serial No. 507,216

2 Claims. (Cl. 33—126.4)

This invention relates in general to new and useful improvements in measuring devices, and more specifically, to an improved oil dip stick for internal combustion engines.

In order to determine the amount of oil remaining in the crankcase of an internal combustion engine, there is provided a dip stick which is placed with the lower end thereof depending into the crankcase. The dip stick is provided with numerous markings for indicating the amount of oil which is in the crankcase, the amount of oil being determined by the oil level on the dip stick when it has been drawn. Such a dip stick is impractical from the standpoint that it must be cleaned and then reinserted in the crankcase to properly determine the level of oil therein. Also, the dip stick, after a period of use, becomes corroded and it is difficult to determine by viewing the oil on the dip stick the condition of the oil.

It is therefore the primary object of this invention to provide an improved dip stick which is provided with markings of such a nature whereby the amount of oil remaining in a crankcase may be readily ascertained and at the same time, the condition of such oil may be ascertained.

Another object of this invention is to provide an improved dip stick for internal combustion engines which is so constructed whereby the amount of oil disposed within the crankcase of the internal combustion engine may be ascertained immediately upon the withdrawal of the dip stick the first time and no wiping of the dip stick is necessary.

A further object of this invention is to provide an oil dip stick structure which is in the form of an elongated hollow oil rod which is transparent, the oil rod being intended to have disposed therein the oil from the crankcase which is retained within the oil rod by placing one's finger over an open upper end of the oil rod, the oil within the oil rod clearly showing the contents of the crankcase and the condition of the oil.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the hollow oil dip stick which is the subject of this invention and shows the same in use, an intermediate portion of the oil rod being broken away, spring fingers carried by the handle portion of the oil dip stick being omitted for purposes of clarity;

Figure 2 is a vertical sectional view taken along the length of the oil dip stick of Figure 1 and shows the specific details of the construction thereof, the oil rod being shown in elevation, only the lower end of the oil rod being shown in section; and Figure 3 is an enlarged sectional view taken through the oil rod.

Referring now to the drawings in detail, it will be seen that there is illustrated the hollow oil dip stick which is the subject of this invention, the dip stick being referred to in general by the reference numeral 10. The dip stick 10 includes a combination handle and stop member 12 which is configurated for ease of gripping, as is best illustrated in Figure 1. Extending vertically through the handle 12 is a bore 14 through which the upper portion of an oil rod 16 passes. The oil rod 16 is of a length so that a small part 18 thereof projects above the handle 12.

The oil rod 16 is of a length to be utilized with a particular internal combustion engine for which it is intended. The oil rod 16 is formed of a transparent material, preferably a form of plastic, in order that oil disposed therein may be clearly ascertained.

In order to determine the amount of oil within a crankcase being tested utilizing the dip stick 10, the lower portion of the oil rod 16 is provided with annular markings 20, 22 and 24. The markings 20, 22 and 24 are vertically spaced along the oil rod 16. The marking 20 is preferably green in color and indicates the crankcase is full. The marking 22 is brown in color and indicates that oil need be added to the crankcase. The marking 24 is red in color and serves to indicate that the oil supply in the crankcase is dangerously low.

The lower part of the oil rod 16 also includes a vertical marking 26. The vertical marking 26 is of a color to match the color of the oil in the crankcase when the oil is dirty and requires changing. Thus, when the oil disposed within the oil rod 16 blends with the marking 26, it is necessary to change the oil of the crankcase.

In order that the dip stick 10 may be retained properly within a tube (not shown) which is normally associated with a crankcase, there is provided a pair of spring fingers 28. The spring fingers 28 are carried by a supporting disk 30 secured to the lower end of the handle 12.

In order that dirt and other foreign matter may be prevented from entering the upper end of the oil rod 16 during use, there is provided a closure cap 32. The closure cap 32 is hingedly connected to the upper part of the handle 12, as at 34, and is movable to a position out of alignment with the upper end of the oil rod 16, as is best illustrated in Figure 1.

In the operation of the present invention, the handle 12 is grasped by one's hand in the manner best illustrated in Figure 1. The thumb of one's hand is then slipped under the cap 32 in order to pivot the same to the out-of-the-way position of Figure 1. After this has been accomplished, the thumb is placed on the upper end of the oil rod 16 in order to seal the upper end thereof. Then, when the oil rod 16 is withdrawn from the crankcase, the vacuum which will be produced by the tendency for oil to run out of the oil rod 16 will keep such oil within the oil rod 16. After the oil rod 16 has been completely withdrawn from the crankcase, the amount of oil disposed therein may be readily determined upon visual inspection. In this manner, the amount of oil disposed within the crankcase may be readily ascertained. Also, because of the marking 26, the necessity to change such oil may also be readily ascertained.

After the oil has been checked as to quantity and quality, the dip stick 10 is returned to its normal position where it is held in place by the spring arms 28. When the thumb is removed from the upper end of the oil rod 16, the oil disposed within the lower end thereof will then run back into the crankcase by gravity. Because of this particular arrangement, the oil may also be used for lubricating parts of the internal combustion engine, such as the generator and the like, in cases of emergency.

In order that oil may freely circulate in the lower portion of the oil rod 16 during the use of the internal combustion engine and in order to provide for proper operation of the dip stick 10, the closure cap 32 is provided with a vent opening 36. The vent opening 36 is aligned with the open upper end of the oil rod 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An oil dip stick for internal combustion engines, comprising a combined handle and stop member, a tubular oil rod extending upwardly through said handle, a major portion of said oil rod depending below said handle, said oil rod being transparent, markings on said oil rod for facilitating the determining of the amount of oil disposed within the internal combustion engine, said oil rod having an open upper end closable by one's finger to retain oil in said oil rod when withdrawn from an engine for a reading, a closure cap hingedly carried by said handle normally closing said upper end, said closure cap having a vent opening.

2. An oil dip stick for internal combustion engines, comprising a combined handle and stop member, a tubular oil rod extending upwardly through said handle, a major portion of said oil rod depending below said handle, said oil rod being transparent, markings on said oil rod for facilitating the determining of the amount of oil disposed within the internal combustion engine, said oil rod having an open upper end closable by one's finger to retain oil in said oil rod when withdrawn from an engine for a reading, a closure cap hingedly carried by said handle normally closing said upper end, said closure cap having a vent opening, said markings being colored, said markings including one marking extending longitudinally of said oil rod, the color of said one marking being such to blend with dirty oil needing changing whereby the necessity of changing oil is readily ascertainable.

References Cited in the file of this patent

UNITED STATES PATENTS

| | | |
|---|---|---|
| 1,511,591 | Colligan | Oct. 14, 1924 |
| 1,705,121 | Jones | Mar. 12, 1929 |
| 2,343,168 | Bickle | Feb. 29, 1944 |
| 2,363,424 | Keenan | Nov. 21, 1944 |
| 2,660,058 | Vogt | Nov. 24, 1953 |

FOREIGN PATENTS

| | | |
|---|---|---|
| 335,407 | France | Nov. 28, 1903 |